United States Patent [19]

Brady et al.

[11] Patent Number: 5,545,419
[45] Date of Patent: Aug. 13, 1996

[54] PATCH BAG HAVING SUPPLEMENTAL SEAL

[75] Inventors: Sean A. Brady, Greer; Henry W. Stockley, III, Spartanburg, both of S.C.

[73] Assignee: W. R. Grace & Co.-Conn., Duncan, S.C.

[21] Appl. No.: 278,367

[22] Filed: Jul. 21, 1994

[51] Int. Cl.⁶ ............................ B65D 30/08; B65D 30/14; B65D 85/00
[52] U.S. Cl. .......................... 426/129; 426/127; 426/415; 383/109; 383/114
[58] Field of Search ...................................... 426/124, 127, 426/129, 415; 383/109, 114, 116, 119

[56] References Cited

U.S. PATENT DOCUMENTS

| | | | |
|---|---|---|---|
| 4,136,205 | 1/1979 | Quattlebaum | 426/412 |
| 4,239,111 | 12/1980 | Conant et al. | 206/484 |
| 4,267,960 | 5/1981 | Lind et al. | 229/55 |
| 4,285,998 | 8/1981 | Thibodeau | 428/35 |
| 4,452,835 | 6/1984 | Vasudevan . | |
| 4,534,984 | 8/1985 | Keuhne | 426/412 |
| 4,539,236 | 9/1985 | Vilutis | 428/35 |
| 4,629,064 | 12/1986 | Barner | 206/204 |
| 4,765,857 | 8/1988 | Ferguson | 156/229 |
| 4,801,486 | 1/1989 | Quacquarella et al. | 428/34.9 |
| 4,815,590 | 3/1989 | Peppiatt et al. | 206/204 |
| 5,020,922 | 6/1991 | Schirmer | 383/119 |
| 5,236,728 | 8/1993 | Lock et al. | 426/307 |
| 5,256,428 | 10/1993 | Lustig et al. | 426/127 |
| 5,302,402 | 4/1994 | Dudenhoeffer et al. | 426/129 |

FOREIGN PATENT DOCUMENTS 925035   5/1963   United Kingdom .

Primary Examiner—Donald E. Czaja
Assistant Examiner—Curtis E. Sherrer
Attorney, Agent, or Firm—Rupert B. Hurley, Jr.; Mark B. Quatt; John J. Wasatonic

[57] ABSTRACT

A patch bag has a patch adhered to a bag, with a primary seal primary seal across an uncovered portion of the bag, and a supplemental seal inward of the primary seal. The supplemental seal reduces or eliminates an uncovered region between the primary seal and the patch, and prevents a product in the bag from contacting the primary seal. The patch bag is especially useful in the packaging of a bone-in meat product, especially ham, sparerib, picnic, back rib, short loin, short rib, whole turkey, pork loin.

23 Claims, 10 Drawing Sheets

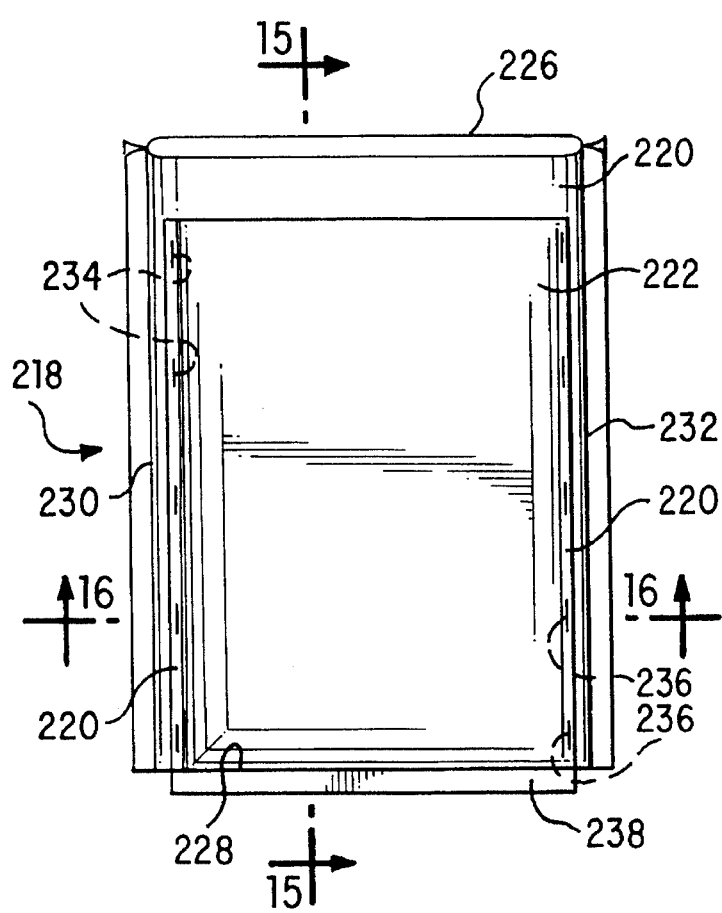
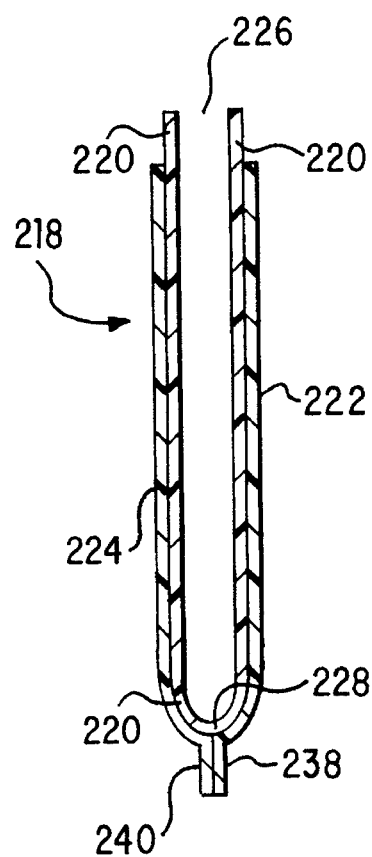
FIG. 14        FIG. 15
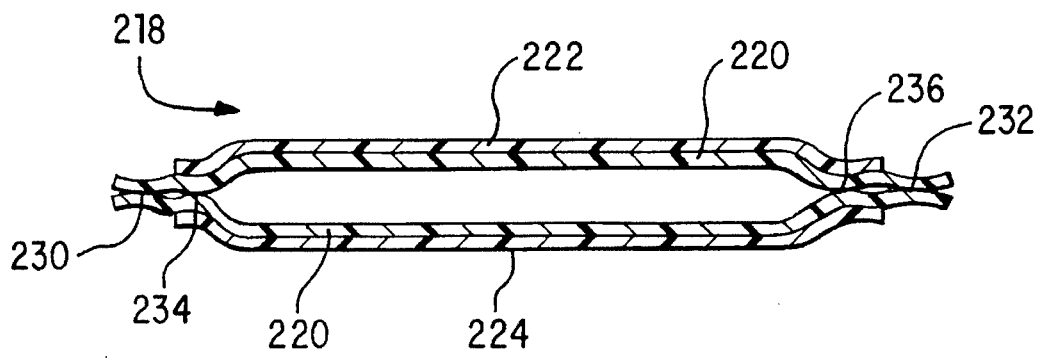
FIG. 16

PATCH BAG HAVING SUPPLEMENTAL SEAL

FIELD OF THE INVENTION

The present invention relates to packages for the packaging of bone-in meat products. More particularly, the present invention relates to a bag having a protective patch adhered directly thereto, the protective patch preventing of bone puncture, or reducing the likelihood of bone puncture.

BACKGROUND OF THE INVENTION

Heat-shrinkable thermoplastics are known to be useful as flexible packaging materials for vacuum packaging various foodstuffs, including meat. Such plastic materials, however, while generally suitable for packaging meat, understandably have difficulties in successfully packaging sharp or bony products. For example, attempts to package bone-in primal cuts of meat usually result in an unsatisfactorily large number of bag failures due to bone punctures. The use of cushioning materials such as paper, paper laminates, wax impregnated cloth, and various types of plastic inserts have proved to be less than totally satisfactory in solving the problem. The preparation of special cuts of meat or close bone trim with removal of protruding bones has also been attempted. However, this is at best only a limited solution to the problem since it does not offer the positive protection necessary for a wide variety of commercial bone-in types of meat. Furthermore, removal of the bone is a relatively expensive and time-consuming procedure.

The use of heat-shrinkable bags having one or two patches adhered thereto has recently become a commercially-preferred manner of packaging a number of bone-in meat products. However, even the bags having two patches thereon leave "uncovered regions" (i.e., regions of the bag which are not covered by the patch, also herein referred to as "bald regions") which are more vulnerable to puncture because they do not have a patch adhered thereover.

It has been found that in the packaging of several bone-in meat products, for example with a patch bag containing a pair of bone-in pork loins, the bones cause bag failures to occur if the patch bag has one or more uncovered regions along the length of the bag, and/or along the bottom of the bag. An undesirable level of bag failures occur when these uncovered regions contact the bone-in meat product.

Providing a much-oversized bag can be used to reduce the number of punctures, as the pork loins can be placed in the center of the bag so that the uncovered regions are present on "dog-ears" emanating from the package. However, this solution to the problem is not entirely satisfactory, for several reasons. First, there is the inefficiency of wasted package due to the excessive bag size required to keep the uncovered areas away from the pork loins. Second, the dog-ears running the length of the package provide an aesthetically less-attractive package. Third, the loins must be carefully placed in the center of the bag, to avoid bone contact with the uncovered areas. Fourth, the meat has the potential to slide around inside the oversized bag, resulting in the potential for the bone to contact uncovered regions, thus increasing the potential for package failure.

It would be desirable to have a patch bag in which the product cannot contact uncovered regions across the bottom of an end-seal bag, in order to reduce or eliminate the number of bone punctures through the bag.

However, making, for example, an end-seal patch bag in which the patch extends to the bottom edge of the bag, requires that the bottom seal be through the patch as well as the bag, assuming that the patch is applied to the bag tubing before the bottom seal is produced. Sealing by passing heat through one or more patches is undesirable because such seals are not as strong as seals made through the bag alone. Furthermore, seals made through the patches and bags are subject to burn through due to the need to conduct heat completely through the patch material. Thus, it is desirable to provide a patch bag in which the product contacts only covered regions of the bag, or contacts less uncovered region, relative to patch bags in which the seal is a substantial distance from the edge of the patch.

SUMMARY OF THE INVENTION

The present invention provides a patch bag in which a supplemental seal, i.e., secondary seal, is used to prevent the product from contacting regions of the bag which are not covered by a patch. In this manner, the puncture-resistance of the bag is improved. The patch bag of the present invention provides more effective patch coverage, i.e., less uncovered area for the product to contact, or even no uncovered area for the product to contact. In this manner, the patch bag of the present invention can reduce the number of bag punctures at uncovered regions, especially for the packaging of bone-in meat products such as pork loins.

As a first aspect, the present invention pertains to a patch bag, comprising a bag and a patch adhered to the bag. The patch covers a portion of the bag. The patch bag has a primary seal across an uncovered portion of the bag, and a supplemental seal inward of the primary seal.

As a second aspect, the present invention pertains to a packaged product. The packaged product comprises: (A) a package comprising a patch bag comprising a bag and a patch adhered to the bag and covering a portion of the bag, and a primary seal across an uncovered portion of the bag, the patch bag further comprising a supplemental seal inward of the primary seal; and (B) a meat product in said package, the meat product comprising bone. Preferably, the meat product comprises a bone-in meat product comprising at least one member selected from the group consisting of ham, sparerib, picnic, back rib, short loin, short rib, pork loin, and whole turkey. More preferably, the meat product comprises two bone-in pork loins.

BRIEF DESCRIPTION OF THE DRAWINGS

FIG. 14 illustrates a schematic of a side seal patch bag according to the present invention, in a lay-flat view.

FIG. 15 illustrates a cross-sectional view of the side-seal patch bag illustrated in FIG. 14, taken through section 15—15 of FIG. 14.

FIG. 16 illustrates a cross-sectional view of the side-seal patch bag illustrated in FIG. 14, taken through section 16—16 of FIG. 14.

DETAILED DESCRIPTION OF THE INVENTION

Figure 1:
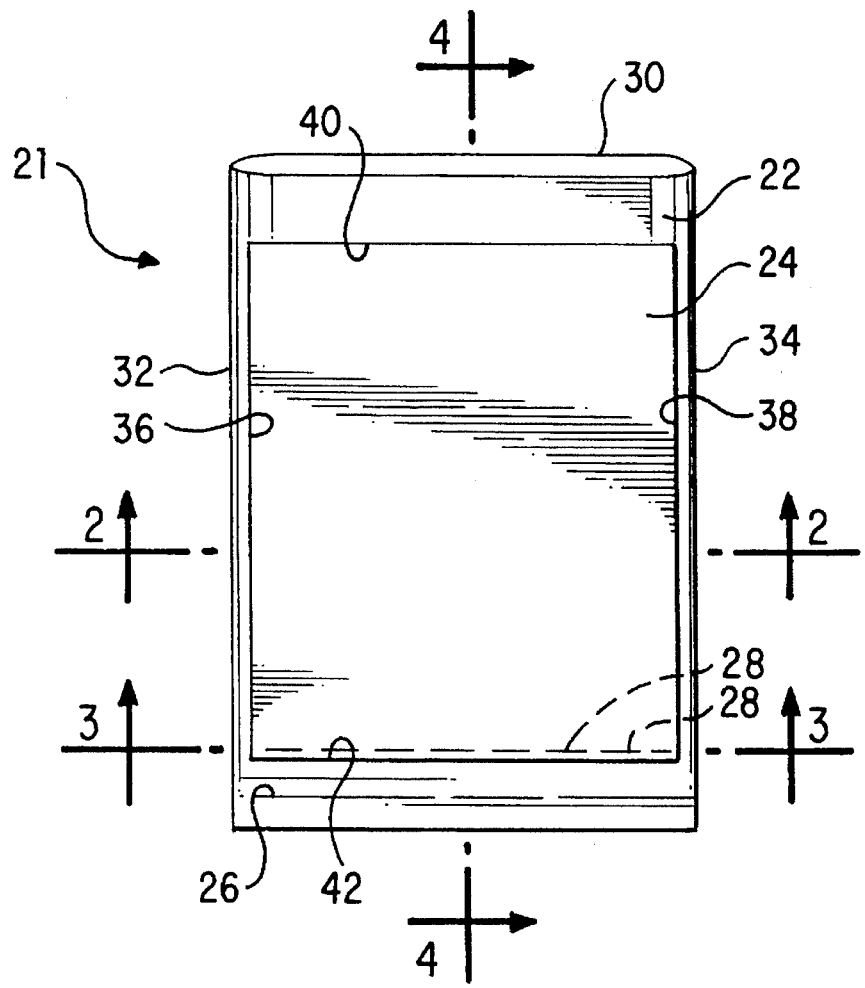
FIG. 1 illustrates a schematic view of a preferred end-seal patch bag according to the present invention, in a lay-flat view.

As used herein, the phrase "uncovered portion of the bag" refers to a portion of the bag which is not covered by a patch, i.e., a portion of the bag having both its inside surface and its outside surface not adhered to, or otherwise covered by, one or more patches.

As used herein, the phrase "inward of the seal" refers to that region of the patch bag which extends from any seal towards the center of the bag, when the bag is in a lay-flat position, i.e., which extends from the seal towards the portion of the bag which surrounds a product within the bag.

As used herein, the phrase "inward of the patch" refers to that region of the patch bag which extends from any edge, of any patch thereon, towards the center of the bag, when the bag is in a lay-flat position, i.e., which extends from a patch edge towards the portion of the bag which surrounds a product within the bag.

As used herein, the phrase "substantially parallel", with respect to the relationship between the primary seal and the supplemental seal, includes supplemental seals which are oriented from 0 to 30 degrees of the overall orientation of the primary seal. Preferably, the supplemental seal is oriented from 0 to 10 degrees of the overall orientation of the primary seal; more preferably, from 0 to 5 degrees.

As used herein, the phrase "patches substantially aligned when the patch bag is in the lay-flat position" refers to patch alignment, when the patch bag is in its lay-flat position, so that at least one edge of one of the patches is within 0.5 inches of a corresponding edge of the other patch; preferably, within 0.2 inch; more preferably, within 0.1 inch. Preferably, each of the patches have four sides, a preferably, each of the edges of each of the patches being substantially aligned with the corresponding edge of the other patch.

As used herein, the term "film" is used in a generic sense to include plastic web, regardless of whether it is film or sheet. Preferably, films of and used in the present invention have a thickness of 0.25 mm or less. As used herein, the term "package" refers to packaging materials used in the packaging of a product.

As used herein, the phrase "patch overhang region", or "overhang", refers to that portion of a patch which extends beyond: (a) a side edge of the bag to which the patch is adhered, or (b) a bottom edge of the bag to which the patch is adhered, when the bag is in a lay-flat configuration, i.e., when the factory seal(s) is flat against a surface on which the bag has been placed.

The "factory seal" includes any and all seals necessary to convert a film tubing or flat film into a bag having an open top. Such seals are made at the bag-making factory, and hence are herein termed to be "factory seals".

The bag "edge", or "sideline", or "bottomline", beyond which a patch may overhang, is usually formed by a mere "fold" in the bag. Although the bag need not have a crease at its edges, in reality the side edges of end seal bags are creased by processing rollers in the manufacture of the tubing and bags, as is the bottom edge of side-seal bags. However, the edge, sideline, or bottomline also includes bag side and bottom edges which are relatively small regions (i.e., 0.05 inches to either side of the "line") extending from a seal through both the patch and the underlying bag. Bag edges, sidelines, and bottomlines are determined by placing an empty bag on a flat supporting surface, with the factory seals flat against the supporting surface. The perimeter of the bag in its lay-flat configuration determines the edges, sidelines, and bottomline.

As used herein, the phrases "seal layer", "sealing layer", "heat seal layer", and "sealant layer", refer to an outer film layer, or layers, involved in the sealing of the film to itself, another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers adjacent this sealant layer, the inside layer frequently also serving as a food contact layer in the packaging of foods. In general, a sealant layer to be sealed by heat-sealing can comprise any thermoplastic polymer; preferably, the heat-sealing layer comprises, for example, thermoplastic polyolefin, thermoplastic polyamide, thermoplastic polyester, and thermoplastic polyvinyl chloride; more preferably, thermoplastic polyolefin; still more preferably, thermoplastic polyolefin having less than 60 weight percent crystallinity. Preferred sealant compositions are the same as the compositions for the abuse layer, as set forth below.

As used herein, the term "seal" refers to any seal of a first region of a film surface to a second region of a film surface, wherein the seal is formed by heating the regions to at least their respective seal initiation temperatures. The heating can be performed by any one or more of a wide variety of manners, such as using a heated bar, hot air, infrared radiation, ultrasonic sealing, etc.

As used herein, the term "barrier", and the phrase "barrier layer", as applied to films and/or film layers, is used with reference to the ability of a film or film layer to serve as a barrier to one or more gases. Oxygen (i.e., $O_2$) barrier layers can comprise, for example, ethylene/vinyl alcohol copolymer, polyvinyl chloride, polyvinylidene chloride, polyamide, polyester, polyacrylonitrile, etc., as known to those of skill in the art; preferably, the oxygen barrier layer comprises ethylene/vinyl alcohol copolymer, polyvinyl chloride, polyvinylidene chloride, and polyamide; more preferably, vinylidene chloride/methyl acrylate copolymer, as known to those of skill in the art.

As used herein, the phrase "abuse layer", as well as the phrase "puncture-resistant layer", refer to an outer film layer and/or an inner film layer, so long as the film layer serves to resist abrasion, puncture, and other potential causes of reduction of package integrity, as well as potential causes of reduction of package appearance quality. Abuse layers can comprise any polymer, so long as the polymer contributes to achieving an integrity goal and/or an appearance goal; preferably, abuse layers comprise polymer comprising at least one member selected from the group consisting of ethylene/alpha-olefin copolymer having a density of from about 0.85 to 0.95, propylene/ethylene copolymer, polyamide, ethylene/vinyl acetate copolymer, ethylene/methyl acrylate copolymer, and ethylene/butyl acrylate copolymer, etc. as known to those of skill in the art; more preferably, ethylene/vinyl acetate copolymer and ethylene/alpha-olefin copolymer having a density of from about 0.91 to 0.93; still more preferably, the abuse layer of the bag film comprises 85–100 weight percent ethylene/vinyl acetate copolymer, and 0–15 weight percent LLDPE, while the still more preferred abuse layer of the patch film comprises 85–100 weight percent LLDPE and 0–15 weight percent ethylene/vinyl acetate copolymer having a vinyl acetate content of about 9 percent.

As used herein, the term "core", and the phrase "core layer", as applied to multilayer films, refer to any internal film layer which has a primary function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrase "skin layer" refers to an outside layer of a multilayer film in packaging a product, this skin layer being subject to abuse. Accordingly, the preferred polymers for the skin layer are the same as the preferred polymers for the abuse layer.

As used herein, the phrase "tie layer" refers to any internal layer having the primary purpose of adhering two layers to one another. Tie layers can comprise any polymer having a polar group grafted thereon, so that the polymer is capable of covalent bonding to polar polymers such as polyamide and ethylene/vinyl alcohol copolymer; preferably, tie layers comprise at least one member selected from the group consisting of polyolefin, modified polyolefin, ethylene/vinyl acetate copolymer, modified ethylene/vinyl acetate copolymer, and homogeneous ethylene/alpha-olefin copolymer; more preferably, tie layers comprise at least one member selected from the group consisting of anhydride modified grafted linear low density polyethylene, anhydride grafted low density polyethylene, homogeneous ethylene/alpha-olefin copolymer, and anhydride grafted ethylene/vinyl acetate copolymer.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film which provide some specific purpose unrelated to abuse-resistance, modulus, etc. Preferably, bulk layers comprise polyolefin; more preferably, at least one member selected from the group consisting of ethylene/alpha-olefin copolymer, ethylene/alpha-olefin copolymer plastomer, low density polyethylene, and linear low density polyethylene.

As used herein, the phrases "food-contact layer" and "meat-contact layer", refer to a layer of a multilayer film which is in direct contact with the food/meat in the package comprising the film. The food-contact/meat-contact layer is an outer layer of the multilayer film, in the sense that the food-contact/meat-contact layer is in direct contact with the meat product within the package. The food-contact/meat-contact layer is an inside layer in the sense that with respect to the packaged food product/meat product, the food-contact/meat-contact layer is the inside layer (i.e., innermost layer) of the package, this inside layer being in direct contact with the food/meat.

As used herein, the phrase "food-contact surface" and "meat-contact surface" refers to an outer surface of a food-contact layer/meat-contact layer, this outer surface being in direct contact with the food/meat within the package.

As used herein, "EVOH" refers to ethylene/vinyl alcohol copolymer. EVOH includes saponified or hydrolyzed ethylene/vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably at least 50% and more preferably at least 85%.

As used herein, the term "lamination", the term "laminate", and the phrase "laminated film", refer to the process, and resulting product, made by bonding together two or more layers of film or other materials. Lamination can be accomplished by joining layers with adhesives, joining with heat and pressure, and even spread coating and extrusion coating. The term laminate is also inclusive of coextruded multilayer films comprising one or more tie layers.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions. More particularly, the term "oriented", as used herein, refers to oriented films, wherein the orientation can be produced in one or more of a variety of manners.

As used herein, the phrase "orientation ratio" refers to the multiplication product of the extent to which the plastic film material is expanded in several directions, usually two directions perpendicular to one another. Expansion in the machine direction is herein referred to as "drawing", whereas expansion in the transverse direction is herein referred to as "stretching". For films extruded through an annular die, stretching is obtained by "blowing" the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, or sometimes as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. In general, the layers of a film can consist essentially of a single polymer, or can have still additional polymers together therewith, i.e., blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene.

As used herein, the term "polymerization" is inclusive of homopolymerizations, copolymerizations, terpolymerizations, etc., and includes all types of copolymerizations such as random, graft, block, etc. In general, the polymers in the films used in accordance with the present invention, can be prepared in accordance with any suitable polymerization process, including slurry polymerization, gas phase polymerization, and high pressure polymerization processes.

Slurry polymerization processes generally use superatmospheric pressures and temperatures in the range of 40°–100° C. In a slurry polymerization, a suspension of solid, particulate polymer is formed in a liquid polymerization medium to which are added ethylene and comonomers, and often hydrogen along with catalyst. The liquid employed in the polymerization medium can be an alkane, cycloalkane, or an aromatic hydrocarbon such as toluene, ethylbenzene or xylene. The medium employed should be liquid under the conditions of polymerization, and relatively inert. Preferably, hexane or toluene is employed.

Alternatively, gas-phase polymerization process utilizes superatmospheric pressure and temperature in the range of about 50°–120° C. Gas phase polymerization can be performed in a stirred or fluidized bed of catalyst and product particles, in a pressure vessel adapted to permit the separation of product particles from unreacted gases. Ethylene, comonomer, hydrogen and an inert diluent gas such as nitrogen can be introduced or recirculated so as to maintain the particles at temperatures of 50°–120° C. Triethylaluminum may be added as needed as a scavenger of water, oxygen, and other impurities. Polymer product can be withdrawn continuously or semicontinuously, at a rate such as to maintain a constant product inventory in the reactor. After polymerization and deactivation of the catalyst, the product polymer can be recovered by any suitable means. In commercial practice, the polymer product can be recovered directly from the gas phase reactor, freed of residual monomer with a nitrogen purge, and used without further deactivation or catalyst removal.

High pressure polymerization processes utilize a catalyst system comprising a cyclopentadienyl-transition metal compound and an alumoxane compound. It is important, in the high-pressure process, that the polymerization temperature be above about 120° C., but below the decomposition temperature of the polymer product. It is also important that the polymerization pressure be above about 500 bar (kg/cm$^2$). In those situations wherein the molecular weight of the polymer product that would be produced at a given set of operating conditions is higher than desired, any of the techniques known in the art for control of molecular weight, such as the use of hydrogen or reactor temperature, may be used in the process of this invention.

As used herein, the term "copolymerization" refers to the simultaneous polymerization of two or more monomers.

As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

As used herein, copolymers are identified, i.e, named, in terms of the monomers from which the copolymers are produced. For example, the phrase "propylene/ethylene copolymer" refers to a copolymer produced by the copolymerization of both propylene and ethylene, with or without additional comonomer(s). A copolymer comprises recurring "polymerization units" derived from the monomers from which the copolymer is produced.

As used herein, the phrase "polymerization unit" refers to a unit of a polymer, as derived from a monomer used in the polymerization reaction. For example, the phrase "alpha-olefin polymerization units" refers to a unit in, for example, an ethylene/alpha-olefin copolymer, the polymerization unit being that "residue" which is derived from the alpha-olefin monomer after it reacts to become a portion of the polymer chain, i.e., that portion of the polymer contributed by an individual alpha-olefin monomer after it reacts to become a portion of the polymer chain.

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous polymers are useful in various layers of the film used in the present invention. Although there are a few exceptions (such as TAFMER (TM) ethylene/alpha-olefin copolymers produced by Mitsui Petrochemical Corporation), heterogeneous polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum, as is disclosed in patents such as U.S. Pat. No. 4,302,565, to GOEKE, et. al., and U.S. Pat. No. 4,302, 566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention generally has ($M_w/M_n$) of less than 2.7; preferably from about 1.9 to 2.5; more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p.441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers in the multilayer films of the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 110° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 110° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. No. 5,206,075, U.S. Pat. No. 5,241,031, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties.

As used herein, the phrase "homogeneous catalyst" refers to a catalyst suitable for use in the polymerization of homogeneous polymers, as defined above. Homogeneous catalysts are also referred to as "single site catalysts", due to the fact that such catalysts typically have only one type of catalytic site, which is believed to be the basis for the homogeneity of the polymers they catalyze the polymerization of.

As used herein, the term "polyolefin" refers to any polymerized olefin, which can be linear, branched, cyclic, aliphatic, aromatic, substituted, or unsubstituted.

More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type.

As used herein, the phrase "modified polymer", as well as more specific phrases such as "modified ethylene/vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrase "anhydride-containing polymer" and "anhydride-modified polymer", refer to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the phrase "ethylene alpha-olefin copolymer", and "ethylene/alpha-olefin copolymer", refer to such heterogeneous materials as linear low density polyethylene (LLDPE), and very low and ultra low density polyethylene (VLDPE and ULDPE); and homogeneous polymers such as metallocene catalyzed polymers such as EXACT (TM) resins obtainable from the Exxon Chemical Company, and TAFMER (TM) resins obtainable from the Mitsui Petrochemical Corporation. All these materials generally include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefin commonly known as LLDPE has a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from the Dow Chemical Company, known as AFFINITY (TM) resins, are also included as another type of homogeneous ethylene alpha-olefin copolymer useful in the present invention.

In general, the ethylene/alpha-olefin copolymer comprises a copolymer resulting from the copolymerization of from about 80 to 99 weight percent ethylene and from 1 to 20 weight percent alpha-olefin. Preferably, the ethylene/alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "outer layer" refers to any film layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "inside layer" refers to the outer layer, of a multilayer film packaging a product, which is closest to the product, relative to the other layers of the multilayer film.

As used herein, the phrase "outside layer" refers to the outer layer, of a multilayer film packaging a product, which is furthest from the product relative to the other layers of the multilayer film.

As used herein, the term "adhered" is inclusive of films which are directly adhered to one another using a heat seal or other means, as well as films which are adhered to one another using an adhesive which is between the two films.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when subjected to selected heat, as measured by ASTM D 2732, as known to those of skill in the art.

Although the majority of the above definitions are substantially as understood by those of skill in the art, one or more of the above definitions may be defined hereinabove in a manner differing from the meaning as ordinarily understood by those of skill in the art, due to the particular description herein of the present invention.

Although the films used in the patch bag according to the present invention can be monolayer films or multilayer films, the patch bag comprises at least two films laminated together. Preferably, the patch bag is comprised of films which together comprise a total of from 2 to 20 layers; more preferably, from 2 to 12 layers; and still more preferably, from 4 to 9 layers.

In general, the multilayer film(s) used in the present invention can have any total thickness desired, so long as the film provides the desired properties for the particular packaging operation in which the film is used, e.g. abuse-resistance (especially puncture-resistance), modulus, seal strength, optics, etc.

Figure 2:
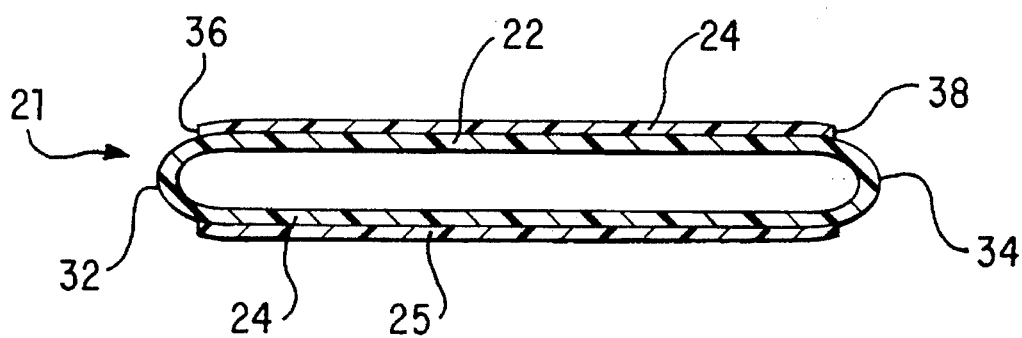
FIG. 2 illustrates a cross-sectional view of the end-seal patch bag illustrated in FIG. 1, taken through section 2—2 of FIG. 1.
Figure 3:
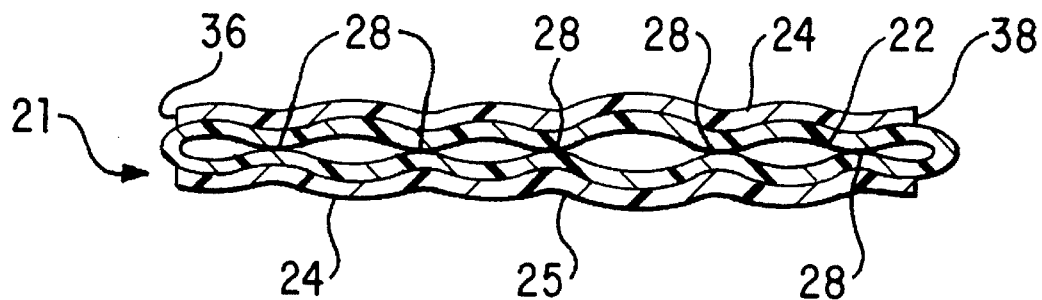
FIG. 3 illustrates a cross-sectional view of the end-seal patch bag illustrated in FIG. 1, taken through section 3—3 of FIG. 1.
Figure 4:
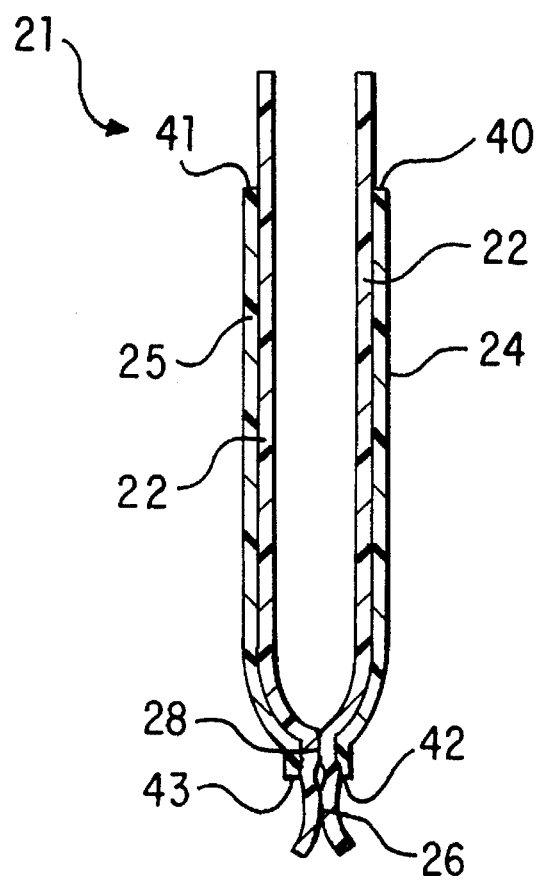
FIG. 4 illustrates a cross-sectional view of the end-seal patch bag illustrated in FIG. 1, taken through section 4—4 of FIG. 1.

FIG. 1 is a side-view illustration of a preferred patch bag 21, in a lay-flat position, this patch bag being in accord with the present invention; FIG. 2 is a cross-sectional view of patch bag 21 taken through section 2—2 of FIG. 1; FIG. 3 is a cross-sectional view of patch bag 21 taken through section 3—3 of FIG. 1; and, FIG. 4 is a cross-sectional view of patch bag 21 taken through section 4—4 of FIG. 1.

Viewing FIGS. 1, 2, 3, and 4 together, patch bag 21 comprises bag 22, front patch 24, and second patch 25. Patch bag 21 has primary end-seal 26, a plurality of supplemental end-seals 28, open top 30, first bag side edge 32, and second bag side edge 34. Front patch 24 has front patch side edge 36, second patch side edge 38, patch top edge 40, and patch bottom edge 42.

That portion of bag 22 to which front patch 24 is adhered is "covered", i.e, protected, by front patch 24. Upper and lower end portions of patch bag 21 are not covered by front patch 24, in order that a strong factory end seal can be made through bag 22, without having to seal through front patch 24. A seal of bag 22 made through front patch 24 is weaker than sealing through only bag 22, because, given the need to form the seal quickly in the packing of products, the lower rate of heat transfer through the combined bag and patch results in the seal being formed at a lower temperature than would otherwise occur, resulting in a relatively weaker seal.

The intermittent supplemental seal is made by sealing through front patch 24, wherein an inside surface of a tube, from which bag 22 is formed, is sealed to itself at the plurality of intermittent seals 28. This intermittent supplemental seal, as illustrated in FIG. 1, is made up of five separate intermittent seals 28, which are substantially parallel to both front patch bottom edge 24 as well as primary end-seal 26. The intermittent supplemental seal serves to keep a product placed within patch bag 21 from extending downward past patch bottom edge 42, thereby keeping bones in the product from puncturing through the uncovered lower portion of the bag. Furthermore, the intermittent supplemental seal prevents the product from applying pressure to primary end seal 26, thereby reducing the chance that primary end seal 26 will fail.

The intermittent supplemental seal is preferably comprised of from about 2 to 20 individual seals, with each individual seal preferably having a length of from about 0.1 to 8 inches; more preferably 0.1 to 2 inches.

FIGS. 2, 3, and 4 illustrate both front patch 24 as well as back patch 25 on a back side, i.e., "rear side", of patch bag 21. The designations of "front" and "back"/"rear" are merely with respect to that side of patch bag 21 which is up when patch bag 21 is in its lay-flat position. Although the two patches need not be the same size and need not be substantially aligned with one another, preferably the patches are substantially the same size, and preferably the patches are substantially aligned with one another. As can be seen from FIGS. 2, 3, and 4, since patch bag 21 has a symmetrical cross-section, which of the two patches is the "front patch" and which is the "back patch" is arbitrary, depending upon which side of the bag is the "front" when the bag is placed in its lay-flat position.

Preferably, the film stock from which the patches are cut has a total thickness of from about 2 to 8 mils; more preferably, from about 3 to 6 mils.

Figure 5:
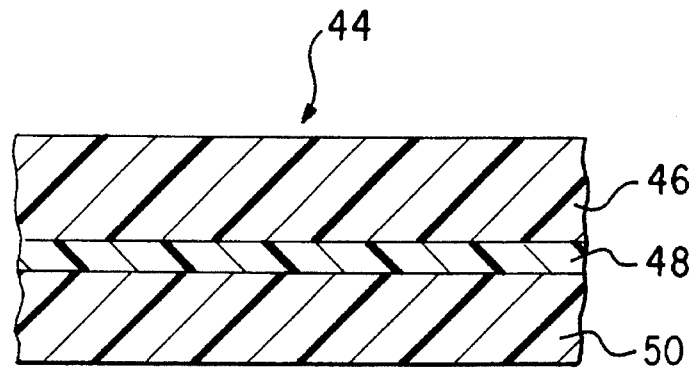
FIG. 5 illustrates a cross-sectional view of a preferred multilayer film suitable for use as the patch in the patch-bag according to FIG. 1.

FIG. 5 illustrates a cross-sectional view of preferred multilayer film 44 for use as the stock material from which patches 24 and 25 are formed. Multilayer film 44 has a physical structure, in terms of number of layers, layer thickness, and layer arrangement and orientation in the patch bag, and a chemical composition in terms of the various polymers, etc. present in each of the layers, as set forth in Table I, below.

TABLE I

| layer designation | layer function | chemical identity | layer thickness (mils) |
| --- | --- | --- | --- |
| 46 | outside layer & puncture-resistant layer | 87% LLDPE #1; 10% EVA #1; 3% antiblock masterbatch #1 | 2.0 |
| 48 | tie layer | EVA #2 | 0.7 |
| 50 | inside layer & puncture-resistant layer | 87% LLDPE #1; 10% EVA #1; 3% antiblock masterbatch #1 | 2.0 |

LLDPE #1 was DOWLEX 2045 (TM) linear low density polyethylene, obtained from the Dow Chemical Company of Midland, Mich. EVA #1 was ELVAX 3128 (TM) ethylene/vinyl acetate copolymer having a 9% vinyl acetate content, obtained from E.I. DuPont de Nemours, of Wilmington, Del. EVA #2 was ELVAX 3175 GC (TM) ethylene/vinyl acetate copolymer having a 28% vinyl acetate content, obtained from E.I. DuPont de Nemours, of Wilmington, Del. Antiblock masterbatch #1 was used in either of two different grades. The first grade, a clear masterbatch, was a masterbatch known as 10,075 ACP SYLOID CONCENTRATE (TM) obtained from Technor Apex Co. of Pautucket, R.I. The second grade, a creme colored masterbatch, was a masterbatch known as EPC 9621C CREAM COLOR SYLOID CONCENTRATE (TM), also obtained from Technor Apex Co. of Pautucket, R.I. The primary difference between these two masterbatches is that of color, which is both aesthetic, and potentially functional in that photosensor alignment means for accurate registration of the patches on the bags can utilize the coloration in the patch for detection of the location of the patch.

Figure 6:
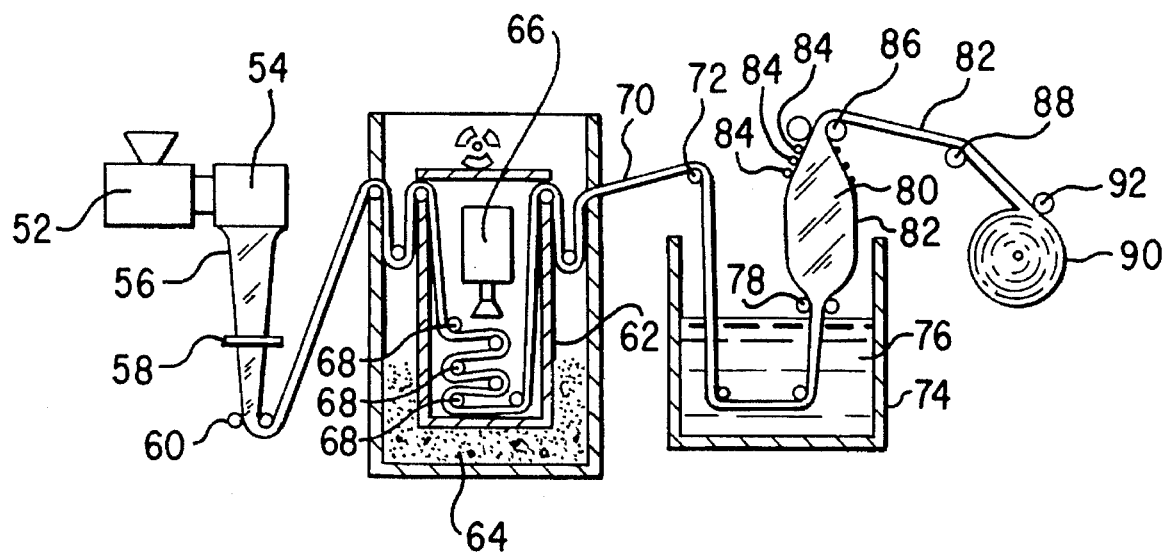
FIG. 6 illustrates a schematic view of a preferred process for making the multilayer film of FIG. 5.

FIG. 6 illustrates a schematic of a preferred process for producing the multilayer film of FIG. 5. In the process illustrated in FIG. 6, solid polymer beads (not illustrated) are fed to a plurality of extruders 52 (for simplicity, only one extruder is illustrated). Inside extruders 52, the polymer beads are forwarded, melted, and degassed, following which the resulting bubble-free melt is forwarded into die head 54, and extruded through annular die, resulting in tubing 56 which is 5–40 mils thick, more preferably 20–30 mils thick, still more preferably, about 25 mils thick.

After cooling or quenching by water spray from cooling ring 58, tubing 56 is collapsed by pinch rolls 60, and is thereafter fed through irradiation vault 62 surrounded by shielding 64, where tubing 56 is irradiated with high energy electrons (i.e., ionizing radiation) from iron core transformer accelerator 66. Tubing 56 is guided through irradiation vault 62 on rolls 68. Preferably, the irradiation of tubing 56 is at a level of about 7 MR.

After irradiation, irradiated tubing 70 is directed over guide roll 72, after which irradiated tubing 70 passes into hot water bath tank 74 containing water 76. The now collapsed irradiated tubing 70 is submersed in the hot water for a retention time of at least about 5 seconds, i.e., for a time period in order to bring the film up to the desired temperature, following which supplemental heating means (not illustrated) including a plurality of steam rolls around which irradiated tubing 70 is partially wound, and optional hot air blowers, elevate the temperature of irradiated tubing 70 to a desired orientation temperature of from about 240° F.–250° F. Thereafter, irradiated film 70 is directed through nip rolls 78, and bubble 80 is blown, thereby transversely stretching irradiated tubing 70. Furthermore, while being blown, i.e., transversely stretched, irradiated film 70 is drawn (i.e., in the longitudinal direction) between nip rolls 78 and nip rolls 86, as nip rolls 86 have a higher surface speed than the surface speed of nip rolls 78. As a result of the transverse stretching and longitudinal drawing, irradiated, biaxially-oriented, blown tubing film 82 is produced, this blown tubing preferably having been both stretched at a ratio of from about 1:1.5–1:6, and drawn at a ratio of from about 1:1.5–1:6. More preferably, the stretching and drawing are each performed at a ratio of from about 1:2–1:4. The result is a biaxial orientation of from about 1:2.25–1:36, more preferably, 1:4–1:16.

While bubble 80 is maintained between pinch rolls 78 and 86, blown tubing 82 is collapsed by rolls 84, and thereafter conveyed through pinch rolls 86 and across guide roll 88, and then rolled onto wind-up roll 90. Idler roll 92 assures a good wind-up.

Preferably, the stock film from which the bag is formed has a total thickness of from about 1.5 to 5 mils; more preferably, about 2.5 mils. Preferably the stock film from which the bag is formed is a multilayer film having from 3 to 7 layers; more preferably, 4 layers.

Figure 7:
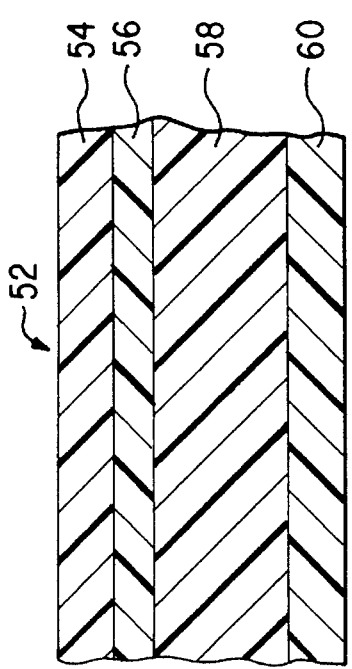
FIG. 7 illustrates a cross-sectional view of a preferred multilayer film suitable for use as the bag in the patch-bag according to FIG. 1.

FIG. 7 illustrates a cross-sectional view of preferred multilayer film 52 for use as the tubing film stock from which bag 21 is formed. Multilayer film 52 has a physical structure, in terms of number of layers, layer thickness, and layer arrangement and orientation in the patch bag, and a chemical composition in terms of the various polymers, etc. present in each of the layers, as set forth in Table II, below.

TABLE II

| layer designation | layer function | chemical identity | layer thickness (mils) |
|---|---|---|---|
| 54 | outside layer & abuse layer | EVA #1 | 0.56 |
| 56 | barrier layer | 96% VDC/MA #1; 2% epoxidized soybean oil; 2% bu-A/MA/bu-MA terpolymer | 0.2 |
| 58 | puncture-resistant layer | 80% LLDPE #1 20% EBA #1 | 1.25 |
| 60 | sealant layer & inside layer | EVA #1 | 0.33 |

EVA #1 was the same ethylene/vinyl acetate copolymer described above. VDC/MA #1 was SARAN MA-134 (TM) vinylidene chloride/methyl acrylate copolymer, obtained from the Dow Chemical Company. The epoxidized soybean oil was PLAS-CHEK 775 (TM) epoxidized soybean oil, obtained from the Bedford Chemical Division of Ferro Corporation, of Walton Hills, Ohio. Bu-A/MA/bu-MA terpolymer was METABLEN L-1000 (TM) butyl acrylate/ methyl methacrylate/butyl methacrylate terpolymer, obtained from Elf Atochem North America, Inc., of 2000 Market Street, Philadelphia, Pa. 19103. EBA #1 was EA 705-009 (TM) ethylene/butyl acrylate copolymer containing 5% butyl acrylate, obtained from the Quantum Chemical Company of Cincinnati, Ohio. Alternatively, EBA #1 can be EA 719-009 (TM) ethylene/butyl acrylate copolymer, having a butyl acrylate content of 18.5%, also obtained from Quantum Chemical Company.

Figure 8:
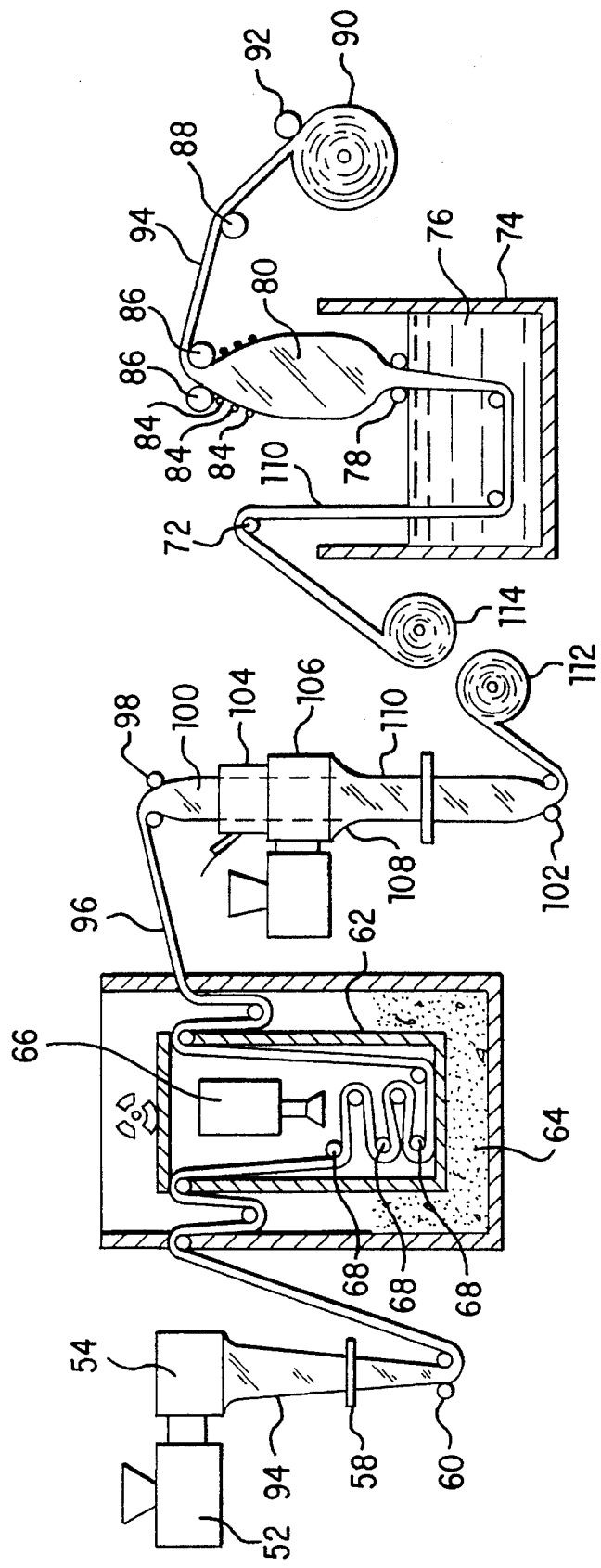
FIG. 8 illustrates a schematic view of a preferred process for making the multilayer film of FIG. 7.

FIG. 8 illustrates a schematic of a preferred process for producing the multilayer film of FIG. 7. In the process illustrated in FIG. 8, solid polymer beads (not illustrated) are fed to a plurality of extruders 52 (for simplicity, only one extruder is illustrated). Inside extruders 52, the polymer beads are forwarded, melted, and degassed, following which the resulting bubble-free melt is forwarded into die head 54, and extruded through an annular die, resulting in tubing 94 which is 10–30 mils thick, more preferably 15–25 mils thick.

After cooling or quenching by water spray from cooling ring 58, tubing 94 is collapsed by pinch rolls 60, and is thereafter fed through irradiation vault 62 surrounded by shielding 64, where tubing 94 is irradiated with high energy electrons (i.e., ionizing radiation) from iron core transformer accelerator 66. Tubing 94 is guided through irradiation vault 62 on rolls 68. Preferably, tubing 94 is irradiated to a level of about 4.5 MR.

After irradiation, irradiated tubing 96 is directed through pinch rolls 98, following which tubing 96 is slightly inflated, resulting in trapped bubble 100. However, at trapped bubble 100, the tubing is not significantly drawn longitudinally, as the surface speed of nip rolls 102 are about the same speed as nip rolls 98. Furthermore, irradiated tubing 96 is inflated only enough to provide a substantially circular tubing without significant transverse orientation, i.e., without stretching.

Slightly inflated, irradiated tubing 96 is passed through vacuum chamber 104, and thereafter forwarded through coating die 106. Second tubular film 108 is melt extruded from coating die 106 and coated onto slightly inflated, irradiated tube 96, to form two-ply tubular film 110. Second tubular film 108 preferably comprises an $O_2$ barrier layer, which does not pass through the ionizing radiation. Further details of the above-described coating step are generally as set forth in U.S. Pat. No. 4,278,738, to BRAX et. al., which is hereby incorporated by reference thereto, in its entirety.

After irradiation and coating, two-ply tubing film 110 is wound up onto windup roll 112. Thereafter, windup roll 112 is removed and installed as unwind roll 114, on a second stage in the process of making the tubing film as ultimately desired. Two-ply tubular film 110, from unwind roll 114, is unwound and passed over guide roll 72, after which two-ply tubular film 110 passes into hot water bath tank 74 containing water 76. The now collapsed, irradiated, coated tubular film 110 is submersed in hot water 76 (having a temperature of about 210° F.) for a retention time of at least about 5 seconds, i.e., for a time period in order to bring the film up to the desired temperature for biaxial orientation. Thereafter, irradiated tubular film 110 is directed through nip rolls 78, and bubble 80 is blown, thereby transversely stretching tubular film 110. Furthermore, while being blown, i.e., transversely stretched, nip rolls 86 draw tubular film 110 in the longitudinal direction, as nip rolls 86 have a surface speed higher than the surface speed of nip rolls 78. As a result of the transverse stretching and longitudinal drawing, irradiated, coated biaxially-oriented blown tubing film 94 is produced, this blown tubing preferably having been both stretched in a ratio of from about 1:1.5–1:6, and drawn in a ratio of from about 1:1.5–1:6. More preferably, the stretching and drawing are each performed a ratio of from about 1:2–1:4. The result is a biaxial orientation of from about 1:2.25–1:36, more preferably, 1:4–1:16. While bubble 80 is maintained between pinch rolls 78 and 86, blown tubing 94 is collapsed by rolls 84, and thereafter conveyed through pinch rolls 86 and across guide roll 88, and then rolled onto wind-up roll 90. Idler roll 92 assures a good wind-up.

The polymer components used to fabricate multilayer films according to the present invention may also contain appropriate amounts of other additives normally included in such compositions. These include slip agents such as talc, antioxidants, fillers, dyes, pigments and dyes, radiation stabilizers, antistatic agents, elastomers, and the like additives known to those of skill in the art of packaging films.

The multilayer films used to make the patch bag of the present invention are preferably irradiated to induce crosslinking, as well as corona treated to roughen the surface of the films which are to be adhered to one another. In the irradiation process, the film is subjected to an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

To produce crosslinking, a suitable radiation dosage of high energy electrons is in the range of up to about 12 MR, more preferably about 2 to about 9 MR, and still more preferably, about 3 MR. Preferably, irradiation is carried out by an electron accelerator and the dosage level is determined by standard dosimetry methods.

Other accelerators such as a Vander Graff or resonating transformer may be used. The radiation is not limited to electrons from an accelerator since any ionizing radiation may be used. The unit of ionizing radiation generally used is the rad, hereinafter referred to as "RAD", which is defined as the amount of radiation which will result in the absorption of 100 ergs of energy per gram of irradiated material. The megarad, hereinafter referred to as "MR", is one million ($10^6$) RAD. The ionizing radiation crosslinks the polymers in the film. Preferably, the film is irradiated at a level of from 2–15 MR, more preferably 2–10 MR, still more preferably, about 7 MR. As can be seen from the descriptions of preferred films for use in the present invention, the most preferred amount of radiation is dependent upon the film and its end use.

As used herein, the phrases "corona treatment" and "corona discharge treatment" refer to subjecting the surfaces of thermoplastic materials, such as polyolefins, to corona discharge, i.e., the ionization of a gas such as air in close proximity to a film surface, the ionization initiated by a high voltage passed through a nearby electrode, and causing oxidation and other changes to the film surface, such as surface roughness.

Corona treatment of polymeric materials is disclosed in U.S. Pat. No. 4,120,716, to BONET, issued Oct. 17, 1978, herein incorporated in its entirety by reference thereto, discloses improved adherence characteristics of the surface of polyethylene by corona treatment, to oxidize the polyethylene surface. U.S. Pat. No. 4,879,430, to HOFFMAN, also hereby incorporated in its entirety by reference thereto, discloses the use of corona discharge for the treatment of plastic webs for use in meat cook-in packaging, with the corona treatment of the inside surface of the web to increase the adhesion of the meat to the adhesion of the meat to the proteinaceous material.

Although corona treatment is a preferred treatment of the multilayer films used to make the patch bag of the present invention, plasma treatment of the film may also be used.

The patches for a preferred patch bag of the present invention as illustrated for example in FIGS. 1, 2, 3, and 4, can be manufactured by a preferred process as illustrated in FIG. 6, discussed in detail above. The process of FIG. 6 comprises the steps of: (A) coextruding a first thermoplastic film; (B) orienting the first thermoplastic film in a machine direction and a transverse direction, so that a first biaxially-oriented, heat-shrinkable, thermoplastic film is produced; (C) cutting a first biaxially-oriented, heat-shrinkable thermoplastic patch from the first biaxially-oriented heat-shrinkable, thermoplastic film; (D) coextruding a second thermoplastic film; (E) orienting the second thermoplastic film in the machine direction and the transverse direction, so that a second biaxially-oriented, heat-shrinkable, thermoplastic film is produced; (F) cutting a second biaxially-oriented, heat-shrinkable thermoplastic patch, from the second biaxially-oriented, heat-shrinkable, thermoplastic film; (G) adhering the first and second biaxially-oriented, heat-shrinkable, thermoplastic patches to a surface of the biaxially-oriented, heat-shrinkable film, preferably in the form of a tubing, in a manner so that the first patch has a first-patch-overhang-region, and the second patch has a second-patch-overhang-region, and at least a portion of said first-patch-overhang-region is adhered to said second-patch-overhang-region; and (H) sealing and cutting the tubing having the first and second patches adhered thereto, so that a patch bag is formed. Preferably, the first patch and the second patch are both cut from one biaxially-oriented, heat-shrinkable, thermoplastic film. Preferably, the one biaxially-oriented, heat-shrinkable, thermoplastic film, from which the first and second patches are cut, comprises a first multilayer film. Preferably, the tubing comprises a second multilayer film.

Preferably, the tubing having the first and second patches adhered thereto is produced by the process illustrated in FIG. 8, discussed above. The process of FIG. 8 comprises the steps of: (A) coextruding a multilayer thermoplastic film tube having an inside film layer and an outside film layer, the inside layer of said thermoplastic tube comprising a first ethylene vinyl acetate copolymer and the outside layer of said tube comprising a composition comprising linear low density polyethylene and a second ethylene vinyl acetate copolymer; (B) applying a sufficient amount of a particulate to an interior surface of the film tube, so that upon collapsing, the tube does not self adhere, but so that, upon drawing (as described in detail below), the drawn tubing can be adhered to itself; (C) collapsing the film tube; (D) irradiating the collapsed tube, resulting in an irradiated tube; (E) opening, inflating, and extrusion coating the tube with at least an $O_2$ barrier layer, resulting in a two-ply tubular film; (F) heating, drawing, and stretching the two-ply tubular film, resulting in a biaxially-oriented tubing; (G) winding up the biaxially-oriented tubing.

Figure 9:
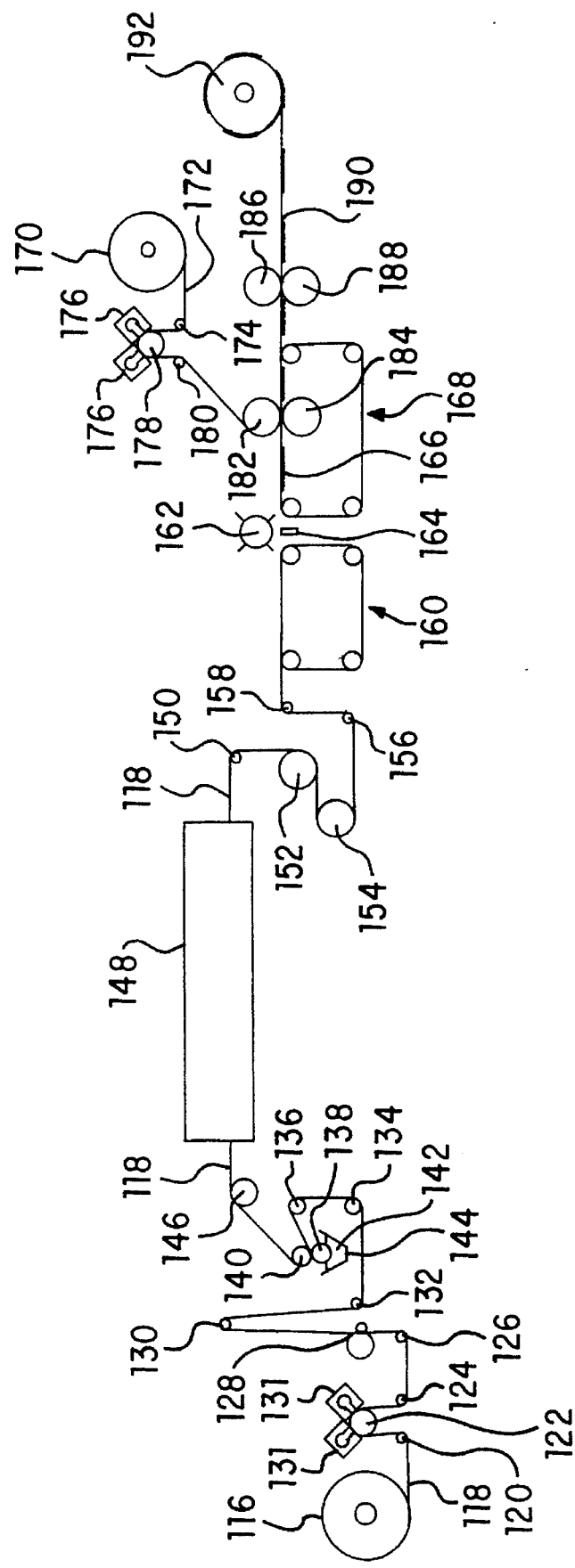
FIG. 9 illustrates a schematic view of a preferred process for making the patch bag of FIG. 1, using the films of FIGS. 5 and 7, as respectively produced by the processes of FIGS. 6 and 8.

In the bag-making process, if an end-seal patch bag is the desired product, the tubing having the first and second patches adhered thereto is sealed and cut so that an end-seal bag is produced. FIG. 9 illustrates a schematic representation of a preferred process for manufacturing a patch bag according to the present invention (e.g., a patch bag as illustrated in FIGS. 1, 2, 3, and 4) from the films as illustrated in FIGS. 5 and 7, which are prepared according to processes as illustrated in FIGS. 6 and 8, respectively.

In FIG. 9, patch film roll 116 supplies patch film 118. Patch film 118 is directed, by idler roll 120, to corona treatment devices 131 which subject the upper surface of patch film 118 to corona treatment as patch film 118 passes over corona treatment roll 122. After corona treatment, patch film 118 is directed, by idler rolls 124 and 126, into (optional) printing roll 128.

Patch film 118 is thereafter directed over idler rolls 130, 132, 134, and 136, after which patch film 118 is passed between a small gap (i.e., a gap wide enough to accommodate patch film 118 passing therethrough while receiving an amount of adhesive which corresponds with a dry coating, i.e., weight after drying, of about 45 milligrams per 10 square inches of patch film) between adhesive application roll 138 and adhesive metering roll 140. Adhesive application roll 138 is partially immersed in adhesive 142 supplied to trough 144. As adhesive roll 138 rotates counter-clockwise, adhesive 142, picked up by the immersed surface of adhesive roll 138, moves upward, contacts, and is metered onto, the full width of one side of patch film 118, moving in the same direction as the surface of adhesive roll 138. [Examples of suitable types of adhesives include thermoplastic acrylic emulsions, solvent based adhesives and high solids adhesives, ultraviolet-cured adhesive, and electron-beam cured adhesive, as known to those of skill in the art. The presently preferred adhesive is a thermoplastic acrylic emulsion known as RHOPLEX N619 (TM) thermoplastic acrylic emulsion, obtained from the Rohm & Haas Company, at Dominion Plaza Suite 545, 17304 Preston Rd., Dallas, Tex. 75252, Rohm & Haas having headquarters at 7th floor, Independence Mall West, Philadelphia, Pa. 19105.] Patch film 118 thereafter passes so far around adhesive metering roll 140 (rotating clockwise) that the adhesive-coated side of patch film 118 is in an orientation wherein the adhesive is on the top surface of patch film 118, as adhesive-coated patch film 118 moves between adhesive metering roll 140 and idler roll 146.

Thereafter, adhesive-coated patch film 118 is directed over drying oven entrance idler roll 146, and passed through oven 148 within which patch film 118 is dried to a degree that adhesive 142 on patch film 118 becomes tacky. Upon exiting oven 148, patch film 118 is directed partially around oven-exit idler roll 150, following which patch film 118 is cooled on chill rolls 152 and 154, each of which has a surface temperature of about 40°–45° F., and a diameter of about 12 inches. The cooling of patch film 118 is carried out in order to stabilize patch film 118 from further shrinkage.

Thereafter, patch film 118 is directed, by idler rolls 156 and 158, onto a belt of pre-cutting vacuum conveyor assembly 160, and thereafter forwarded to a rotary scissor-type knife having upper rotary blade assembly 162 and lower blade 164, the knife cutting across the width of patch film 118 in order to form patches 166. Patches 166 are forwarded and held on top of a belt of post-cutting vacuum conveyor assembly 168. While patches 166 are held on the belt of post-cutting vacuum conveyor assembly 168, tubing-supply roll 170 supplies biaxially oriented, lay-flat film tubing 172, which is directed, by idler roll 174, to corona treatment devices 176 which subject the upper surface of lay-flat tubing film 172 to corona treatment as lay-flat tubing film 172 passes over corona treatment roll 178. After corona treatment, lay-flat tubing film 172 is directed, by idler roll 180, partially around the surface of upper pre-lamination nip roll 182, and through the nip between upper prelaminating nip roll 182 and lower prelaminating nip roll 184, the pre-laminating nip rolls being above and below the post-cutting vacuum conveyor belt. Prelaminating nip rolls 182 and 184 position patches 166 onto the now lower, corona-treated outside surface of lay-flat film tubing 172. After passing through the nip between prelaminating nip rolls 182 and 184, lay-flat tubing 172, having patches 166 laminated intermittently thereon, exits off the downstream end of the post-cutting vacuum conveyor assembly 168, and is directed through the nip between upper laminating nip roll 186 and lower laminating nip roll 188, these rolls exerting pressure (about 75 psi) in order to secure patches 166 to lay-flat tubing 172, to result in patch-laminated lay-flat tubing 190. Thereafter, patch-laminated lay-flat tubing 190 is wound up to form rewind roll 192, with rewind roll 192 having the laminated patches thereon oriented towards the outer-facing surface of rewind roll 192.

In a subsequent process not separately illustrated, rewind roll 192 is removed from its winder and is positioned in the place of tubing supply roll 170, and the process of FIG. 7, described immediately above, is repeated, wherein a second set of patches is laminated to patch-laminated lay-flat tubing 192, this second set of patches being applied to the other side of patch-laminated lay-flat tubing 192. Of course, the second set of patches are accurately aligned and registered so that they are substantially aligned with the positioning of the first set of patches laminated to lay-flat tubing film 172. In order to achieve accurate alignment, photosensors (i.e., photoeyes, etc.), not illustrated, are used to detect the location of the patch. An appropriate location for such a photosensor is upstream of upper pre-lamination roll 182, below the patch-laminated lay-flat tubing.

Throughout the process described above, patches 166 can have a width less than, equal to, or greater than, the width of lay-flat tubing film 172, so that the patches respectively: leave uncovered regions along the sides of the bag, go to the edge of the lay-flat tubing, or, overhang the side edges of lay-flat tubing film 172. Regardless of which of these three alternatives are chosen for the process, the first set of patches applied are preferably matched up, i.e., substantially aligned, with the patch overhangs of the second set of patches, i.e., applied to the second (uncovered) side of lay-flat tubing film 172.

Once both sets of patches have been applied to lay-flat tubing film 172, the resulting two-patch tubing is directed into a bag-making machine, in a process not illustrated.

In general, the primary and supplemental seals can be made using a hot bar (heat seal) or a nichrome wire fixed to a chilled metal bar (impulse seal), as is known to those of skill in the art, or any other sealing means known to those of skill in the art, such as ultrasonic radiation, radio frequency radiation, and laser. The preferred sealing means is an impulse sealer. Films which are predominantly polyethylene are generally sealed using impulse sealing or hot bar sealing. Both linear and shaped seals can be formed, as is known to those of skill in the art.

Preferably, the supplemental seal is made through the patches as well as the bag, i.e., at a covered region of the bag. The primary seal is preferably formed between patches at a position about 1 inch downstream of the downstream end of a pair of patches which are aligned with one another. Immediately following the formation of the primary seal and the supplemental seal (which preferably are both "factory seals" because they are preferably produced by the bag manufacturer rather than the product packager), the sealed tubing is preferably cut completely across, and completely through both sides of the tubing, at a position about 0.75 inch downstream of the factory seal, to result in a bag as illustrated in FIGS. 1, 2, 3, and 4.

As can be readily recognized by those of skill in the art, a process, analogous to the end-seal bag process described immediately above, for the making of side-seal patch bags, for example the side-seal patch bag as illustrated in FIGS. 14, 15, and 16, as well as various other embodiments which can be used to obtain effective full width patch coverage. These alternative embodiments of the bag according to the present invention are described in detail below.

In general, sealing and cutting of tubing to produce bags is disclosed in U.S. Pat. No. 3,552,090, U.S. Pat. No. 3,383,746, and U.S. Ser. No. 844,883, filed Jul. 25, 1969, to OWEN, each of these two U.S. Patents as well as the U.S. Patent application, hereby being incorporated by reference thereto, in their entireties.

In the event that a continuous laminate of the "bag film" and the "patch film" is converted into a bag by sealing through the entire laminate (this embodiment is not illustrated), it is believed that such a patch bag is inferior to the bag as illustrated in FIGS. 1–4 and 10–16, because seals made through the patch film can result in burn through, as well as weaker seals. However, such a bag having both the primary seal and the secondary seal does provide one advantage of the bag according to the present invention, i.e., the advantage of protecting the primary seal from pressure, even rupture, by the product contained in the bag. As such, a bag having both the primary seal as well as a supplemental seal, with both seals being through one or more patches, is advantageous over the same bag lacking the supplemental seal. This advantage is enhanced by the fact that the primary seal, being through the one or more patches, is not as strong as a primary seal made through the bag at an uncovered region of the bag.

FIGS. 10, 11, 12, 13, 14, 15, and 16 illustrate various views of alternative patch bags in accord with the present invention.

Figure 10:
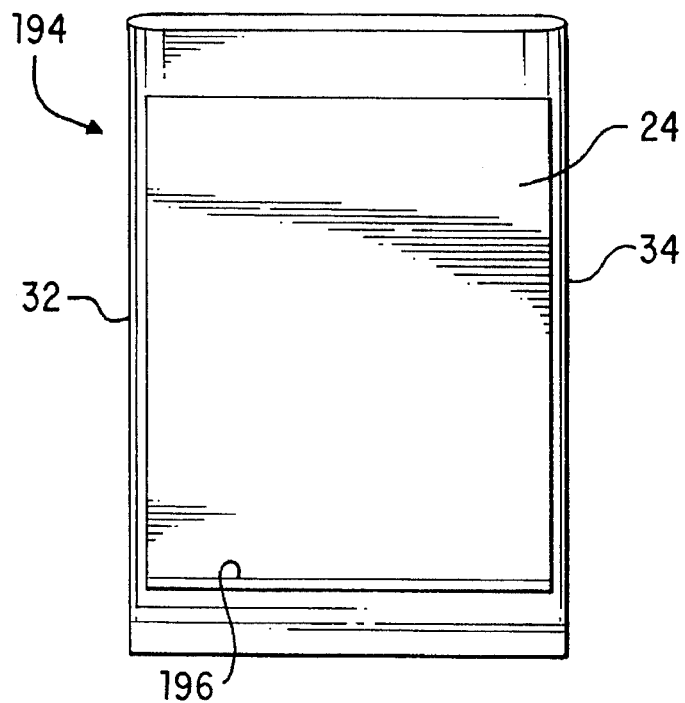
FIG. 10 illustrates a schematic of an alternative embodiment of an end-seal patch bag according to the present invention, in lay-flat view.

FIG. 10 illustrates a schematic of a patch bag 194 which is identical to patch bag 21 of FIGS. 1, 2, 3, and 4, with the exception that patch bag 194 of FIG. 10 has "continuous" supplemental seal 196, rather than the plurality of intermittent supplemental seals 28 in patch bag 21. As illustrated in FIG. 10, continuous supplemental seal 196 extends across the entirety of front patch 24 (as well as back patch 25, not illustrated), but does not extend across uncovered portions along first bag side edge 32 and/or second bag side edge 34, in order to avoid burn through of the bag due to the larger amount of heat required to form the secondary seal through patches 24 and 25.

Figure 11:
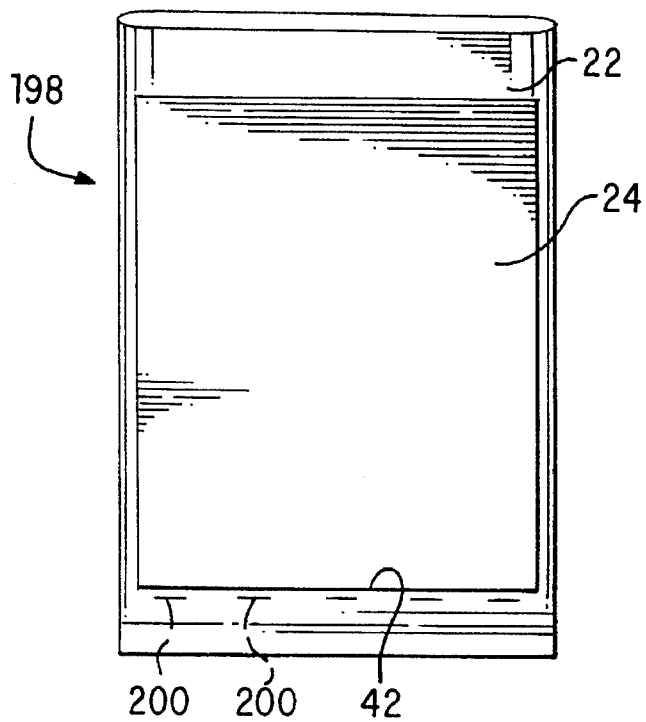
FIG. 11 illustrates a schematic of an alternative embodiment of an end-seal patch bag according to the present invention, in lay-flat view.

FIG. 11 illustrates a schematic of patch bag 198, which is identical to patch bag 21 of FIGS. 1, 2, 3, and 4, with the exception that patch bag 198 of FIG. 11 has a plurality of supplemental end seals 200 at an uncovered portion of bag 22, rather than having the plurality of supplemental end seals at a covered portion of bag 22. Patch bag 198 is an alternative to patch bag 21, and has the advantage of stronger supplemental seals 200 than supplemental seals 28 of patch bag 21 of FIG. 1. Furthermore, since supplemental seals 200 are not made through front patch 24 or back patch 25 (not illustrated in FIG. 11, but as illustrated in FIGS. 2–4), seals 200 have less chance of burn through, and can be made more efficiently, in terms of time and temperature, than seals 28 through one or more of front patch 24 and back patch 25. However, patch bag 198 has the disadvantage of providing a small amount of uncovered area in a narrow region immediately below front patch bottom edge 42 and back patch bottom edge 43 (again not illustrated in FIG. 11, but analogous to bottom edge 43 in FIG. 4). Preferably, supplemental seals 200 are about 0.01 inch below front patch bottom edge 42.

Figure 12:
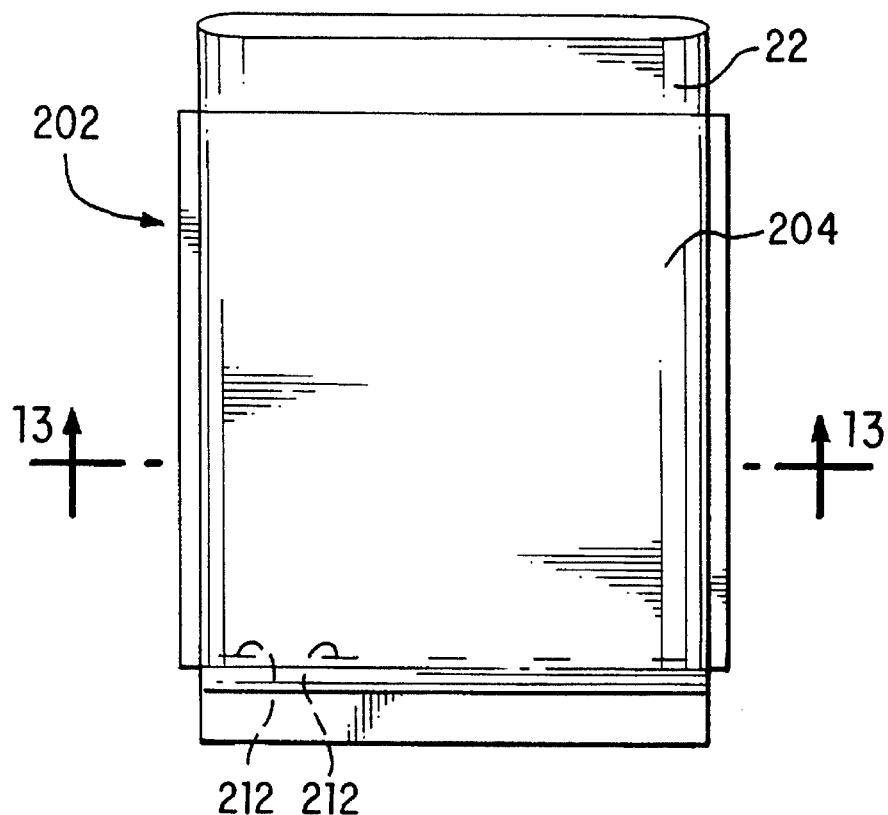
FIG. 12 illustrates a schematic of an alternative embodiment of an end-seal patch bag according to the present invention, in lay-flat view.
Figure 13:
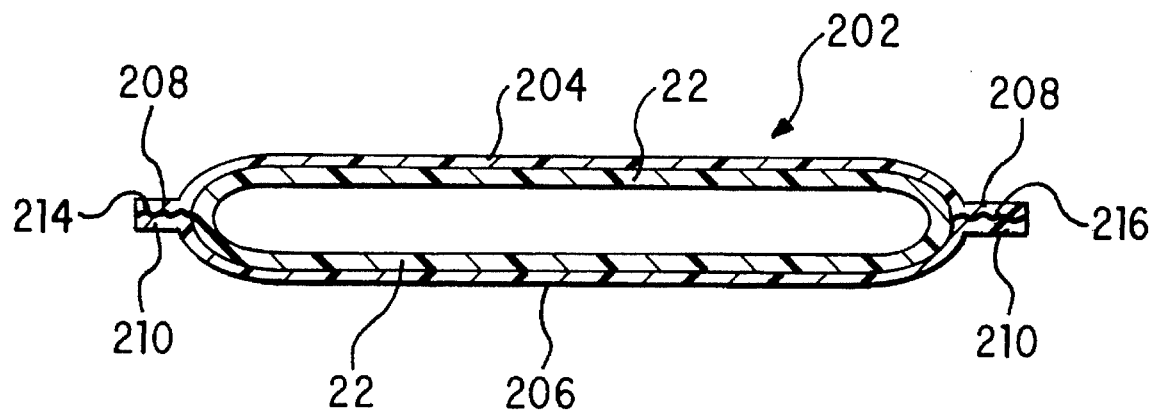
FIG. 13 illustrates a cross-sectional view of the patch bag of FIG. 11, through section 13—13 of FIG. 11.

FIGS. 12 and 13 together illustrate end-seal patch bag 202, another alternative patch bag according to the present invention. As can be seen from the cross-sectional view illustrated in FIG. 13, patch bag 202 has overhanging front patch 204 and overhanging back patch 206, with the two front patch overhanging regions 208 being bonded to the two back patch overhanging regions 210, forming bonds 214 and 216. A plurality of supplemental seals 212 form an intermittent supplemental seal across a bottom region of patches 204 and 206, supplemental seals 212 being made through patches 204 and 206, as well as through bag 22 in its lay-flat position. Patch bag 202 provides the advantage of "full-width" patch coverage over the majority of the length of bag 22, and supplemental seals 212 have the effect of ensuring patch coverage all the way to an effective "bottom" of bag 22, at least with respect to product location within bag 22. Thus, the only uncovered portion of bag 22 is at a top region, i.e., a region above front patch top edge 40 or above back patch top edge (not illustrated, but corresponding to back patch top edge 41 illustrated in FIG. 4). Thus, depending upon where on bag 22 the product packager makes a top seal across bag 22, the product may or may not contact a portion of bag 22 which is uncovered by patch 204 or patch 206.

Patch bags comprising overhanging bonded patches are disclosed in copending U.S. Patent Application (to be assigned), entitled "PATCH BAG HAVING OVERHANGING BONDED PATCHES", filed Jun. 28, 1994, in the name of S. BRADY, et. al., the entirety of which is hereby incorporated by reference thereto.

FIGS. 14, 15, and 16 illustrate patch bag 218, yet another alternative patch bag according to the present invention. Patch bag 218 is a "side seal" patch bag. FIG. 14 illustrates a schematic of side seal patch bag 218, in a lay-flat view; FIG. 15 illustrates a cross-sectional view taken through section 15—15 of FIG. 14; and FIG. 16 illustrates a cross-sectional view taken through section 16—16 of FIG. 14.

With reference to FIGS. 14, 15, and 16 together, side seal patch bag 218 is comprised of bag 220, first patch 222, and second patch 224. Patch bag 218 has open top 226, bottom edge 228, first side seal 230, second side seal 232, a first set of supplemental seals 234 which together form a first intermittent supplemental side seal, a second set of supplemental seals 236 which together form a second intermittent supplemental side seal, first patch overhang 238, and second patch overhang 240. Side seal patch bag 218 has a bottom which is completely covered with the exception of relatively small regions along the sides thereof. In this manner, side seals 230 and 232 can be made through the bag alone, without being made through patches 222 and 224, in order to result in stronger seals than if the seals made through the patches and the bag film.

As illustrated in FIG. 14, the first intermittent supplemental side seal, together with the second intermittent supplemental side seal, prevent product inside the bag from contacting the relatively small uncovered areas along the sides of the bag, in a region throughout the entire length of the patch. Thus, since patch bag 218 has overhanging bonded patches across its bottom and supplemental seals along its side edges (these supplemental seals being through the front and back patches) patch bag 218 prevents product therein from contacting uncovered areas of bag 222 throughout the sides and bottom thereof. Thus, depending upon where the product packager makes a top seal across bag 218, the product may or may not contact any portion of bag 218 which is uncovered by patch 222 or patch 224.

Although not illustrated, another alternative patch bag according to the present invention has a "full length" patch over, for example, the back side of the bag, and a "less than full length patch" over, for example, the front side of the bag, the bag being in its lay-flat position. This bag further comprises a primary seal in a region below the bottom edge of the less than full length patch, and a supplemental seal inward of the primary seal, the supplemental seal preferably being at a location covered by both patches, or, alternatively but less preferably, below the bottom edge of the less than full length patch. In this alternative bag, the primary seal can be made by applying the heat seal bar to the uncovered region of the bag below the "less than full length" patch, so that the resulting seal is stronger than if the seal is formed by passing heat through one or more of the patches.

This patch bag can be produced by adhering a "continuous length" of patch material to a first side of the lay-flat bag tubing, followed by applying a set of separate patches to the second side of the lay-flat bag tubing. Thereafter, the end-seal is made by directly contacting the bag film with the sealing apparatus at "uncovered" regions of the second side of the lay flat tubing. In this manner, at least half of the bottom region of the patch bag can be covered with a patch, while avoiding the need to seal through the patch.

A more detailed disclosure of this patch bag can be found in copending U.S. Patent Application to OBERLE et. al., entitled "PATCH BAG HAVING CONTINUOUS PATCH". Of course, this feature is useful regardless of whether the patches are overhanging and bonded to one another.

Another alternative patch bag which can be used in the present invention is disclosed in U.S. Ser. No. 08/050,942, in the names of G. K. WILLIAMS and S. A. BRADY, filed Apr. 21, 1993, which is hereby incorporated by reference thereto, in its entirety. This application discloses an end-seal patch bag having at least one patch thereon, preferably two patches thereon, wherein the patches are in a "rotated" position when the patch bag is in its lay-flat position. In accordance with the present invention, one or more supplemental seals are made inward of the primary seal in the patch bag disclosed in the WILLIAMS, et. al. application.

In all of the above embodiments of patch bags according to the present invention, the supplemental seal(s) illustrated at a covered portion of the bag could alternatively be at an uncovered portion of the bag, and the primary seals illustrated at an uncovered portion of the bag could be at a covered portion of the bag.

Furthermore, in all of the above embodiments of patch bags according to the present invention, patches which do not overhang one or more edges of the bag could alternatively overhang one or more edges of the bag, and vice versa.

Although in general the bag according to the present invention can be used in the packaging of any product, the bag of the present invention is especially advantageous for the packaging of food products, especially fresh meat products. Among the meat products which can be packaged in the films and packages according to the present invention are poultry, pork, beef, lamb, goat, horse, and fish. Still more preferably, the bag of the present invention is used in the packaging of a pair of bone-in whole pork loins.

Figure 17:
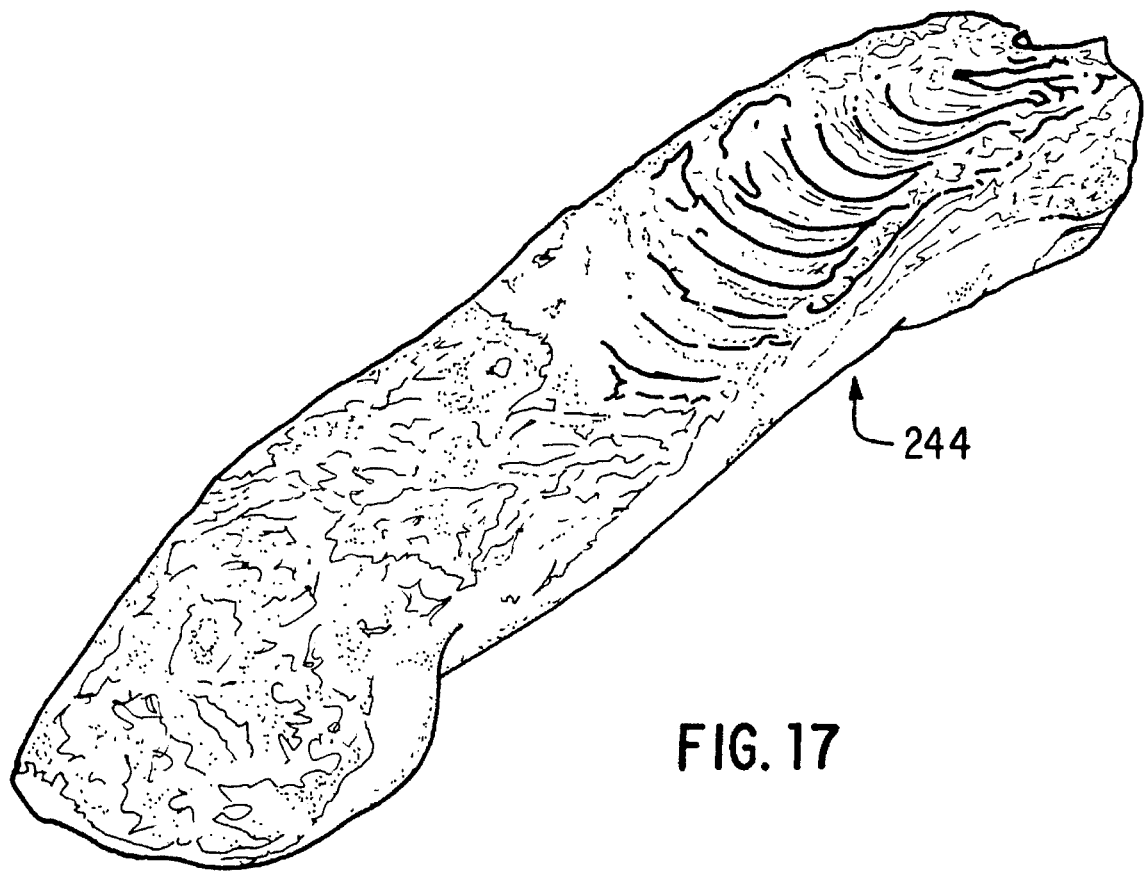
FIG. 17 illustrates a perspective view of a fresh, bone-in whole pork loin, viewed from the ham end.
Figure 18:
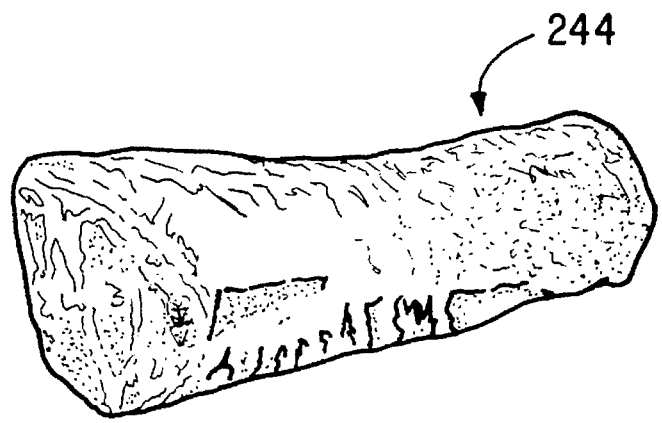
FIG. 18 illustrates a perspective view of fresh, bone-in whole pork loin, viewed from the shoulder end.
Figure 19:
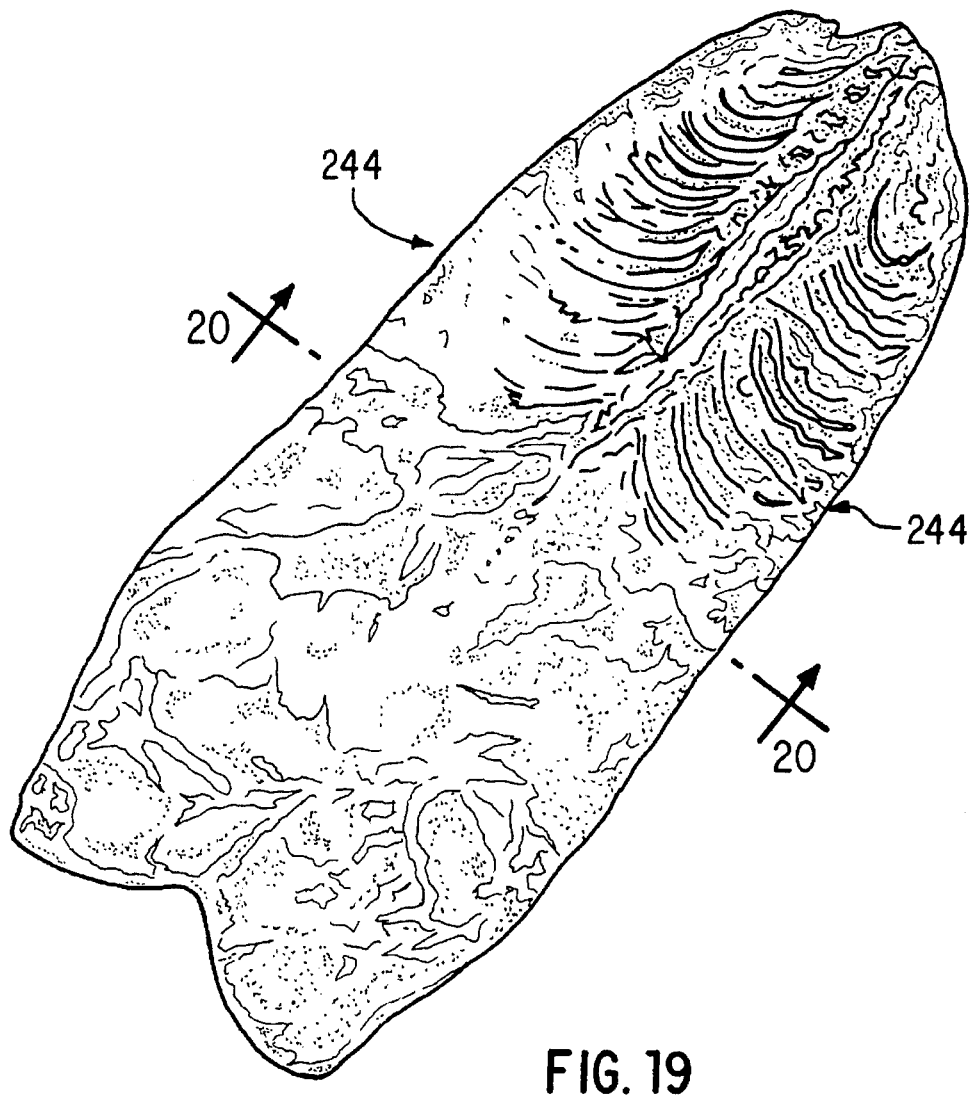
FIG. 19 illustrates a perspective view of a shrunken patch bag containing a pair of fresh, bone-in whole pork loins, each viewed from the ham end.

FIG. 17 illustrates a perspective view of whole bone-in pork loin 244 viewed from the ham end; FIG. 18 illustrates a perspective view of the bone-in whole pork loin 244 viewed from the shoulder end; FIG. 19 illustrates a perspective view of a pair of bone-in whole pork loins 244, each viewed from the ham end, aligned together in a preferred position for packaging in a preferred patch bag as set forth illustrated in FIGS. 1, 2, 3 and 4, as described in detail above. The pair of pork loins as illustrated in FIG. 19 are placed in the patch bag as illustrated in FIGS. 1, 2, 3, and 4, with the patch bag thereafter being evacuated, sealed, and shrunken, to result in a packaged product according to the present invention.

Figure 20:
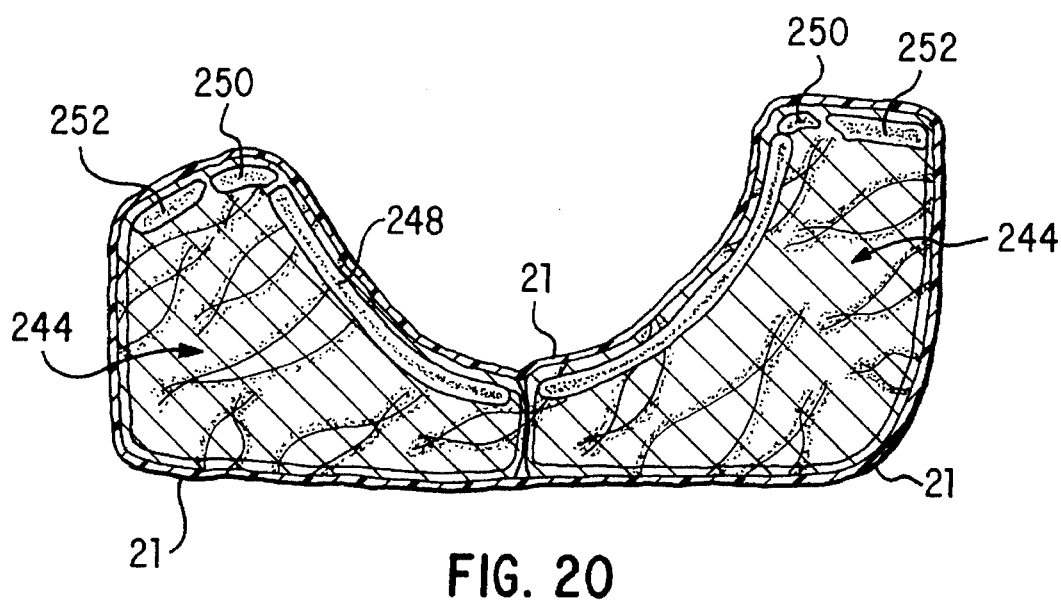
FIG. 20 illustrates a cross-sectional view taken through section 20—20 of FIG. 19, with the addition of a patch bag within which the pair of bone-in pork loins are packaged.

FIG. 20 illustrates a cross-sectional view taken through section 20—20 of FIG. 19, together with the addition of a cross-sectional view of a patch bag 21, i.e., the patch bag illustrated in FIGS. 1, 2, 3, and 4, as described above. Each of pork loins 244 contains rib bone 248, chine bone 250, and feather bone 252. It has been found that using a patch bag in which the patches do not extend to the side edges of the bag, but rather extend only up to about one-half inch from the edge of the bag, allow one or more of rib bone 248, chine bone 250, and feather bone 252 to cause bone punctures.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. A patch bag, comprising a bag and a patch adhered to the bag and covering a portion of a surface of the bag, and a primary seal across an uncovered portion of the bag, the patch bag further comprising a supplemental seal inward of the primary seal, wherein the primary seal is of a first lay-flat side of the bag, to a second lay-flat side of the bag, and the supplemental seal is of the first lay-flat side of the bag to the second lay-flat side of the bag.

2. The patch bag according to claim 1, wherein the supplemental seal is substantially parallel to the primary seal.

3. The patch bag according to claim 1, wherein the supplemental seal is across the bag and in a region extending outward from an edge of a patch to 0.3 inch from the edge of the patch.

4. The patch bag according to claim 3, wherein the supplemental seal is across the bag and in a region extending outward from an edge of a patch to 0.1 inch from the edge of the patch.

5. The patch bag according to claim i, wherein the supplemental seal is across the bag and the patch, and is within a region extending inward from an edge of a patch to 1 inch from the edge of the patch.

6. The patch bag according to claim 5, wherein the region extends inward from an edge of a patch to 0.5 inch from the edge of the patch.

7. The patch bag according to claim 6, wherein the region extends inward from an edge of the patch to 0.2 inch from the edge of the patch.

8. The patch bag according to claim 1, wherein the patch bag comprises two patches.

9. The patch bag according to claim 8, wherein the two patches are substantially aligned with one another when the patch bag is in its lay-flat position.

10. The patch bag according to claim 1, wherein the supplemental seal is an intermittent seal.

11. The patch bag according to claim 10, wherein the intermittent supplemental seal comprises from 2 to 20 individual seals, each individual seal having a length of from about 0.1 inch to about 8 inches.

12. The patch bag according to claim 1, wherein the supplemental seal is a continuous seal.

13. The patch bag according to claim 1, wherein the primary seal is in a region extending outward from about 0.5 inch to 1.5 inches from an edge of the patch.

14. The patch bag according to claim 1, wherein the patch is adhered to the outside surface of the bag.

15. The patch bag according to claim 1, wherein the patch is adhered to the inside surface of the bag.

16. The patch bag according to claim 1, wherein the bag is an end-seal bag.

17. The patch bag according to claim 1, wherein the bag is a side-seal bag.

18. The patch bag according to claim 1, wherein bag comprises a first biaxially-oriented, heat-shrinkable film, and the patch comprises a second biaxially-oriented, heat-shrinkable film.

19. The patch bag according to claim 18, wherein the first biaxially-oriented, heat-shrinkable film is a multilayer film comprising an outside abuse layer, a core $O_2$ barrier layer, and an inside sealant layer.

20. The patch bag according to claim 19, wherein:

the outside abuse layer of the bag comprises at least one member selected from the group consisting of ethylene/alpha-olefin copolymer having a density of from about 0.85 to 0.95 g/cc, polyamide, ethylene/vinyl acetate copolymer, ethylene/methyl acrylate copolymer, and ethylene/butyl acrylate copolymer:

the core $O_2$ barrier layer of the bag comprises at least one member selected from the group consisting of ethylene/vinyl alcohol copolymer, polyvinyl chloride, polyvinylidene chloride, polyamide, polyester, and polyacrylonitrile;

the inside sealant layer comprises at least one member selected from the group consisting of thermoplastic polyolefin, thermoplastic polyamide, thermoplastic polyester, and thermoplastic polyvinyl chloride; and the second biaxially-oriented, heat-shrinkable film comprises at least one member selected from the group consisting of ethylene/alpha-olefin copolymer having a density of from about 0.85 to 0.95 g/cc, polyamide, ethylene/vinyl acetate copolymer, ethylene/methyl acrylate copolymer, and ethylene/butyl acrylate copolymer.

21. A packaged product, comprising:

(A) a package comprising a patch bag comprising a bag and a patch adhered to the bag and covering a portion of a surface of the bag, and a primary seal across an uncovered portion of the bag, the patch bag further comprising a supplemental seal inward of the primary seal, wherein the primary seal is of a first lay-flat side of the bag to a second lay-flat side of the bag, and the supplemental seal is of the first lay-flat side of the bag to the second lay-flat side of the bag; and (B) a meat product in said package, the meat product comprising bone.

22. The packaged product according to claim 21, wherein the meat product comprises a bone-in meat product comprising at least one member selected from the group consisting of ham, sparerib, picnic, back rib, short loin, short rib, whole turkey, pork loin.

23. The packaged product according to claim 22, wherein the meat product comprises two bone-in pork loins.

* * * * *